United States Patent

Thomas

[15] 3,650,156
[45] Mar. 21, 1972

[54] ADJUSTABLE STOP FOR INPUT SHAFT

[72] Inventor: David Carl Thomas, Jenkintown, Pa.

[73] Assignee: FMC Corporation, San Jose, Calif.

[22] Filed: May 20, 1970

[21] Appl. No.: 39,941

[52] U.S. Cl..................................74/10.2, 74/436, 74/526, 192/141
[51] Int. Cl........................................F16h 35/18
[58] Field of Search..................74/10.2, 526, 436; 192/141, 192/142

[56] References Cited

UNITED STATES PATENTS 3,448,624  6/1969  Brown ......................................74/10.2

Primary Examiner—Milton Kaufman
Attorney—F. W. Anderson and C. E. Tripp

[57] ABSTRACT

The number of revolutions imparted to a device such as a valve is limited by a mechanism utilizing intermittent gearing between an input shaft and an adjacent threaded shaft. As the threaded shaft is intermittently turned in response to rotation of the input shaft, travelling nuts on the threaded shaft move axially thereon between positive stops at which the threaded shaft and the input shaft are halted from further rotation.

8 Claims, 7 Drawing Figures

PATENTED MAR 21 1972 3,650,156
SHEET 1 OF 3
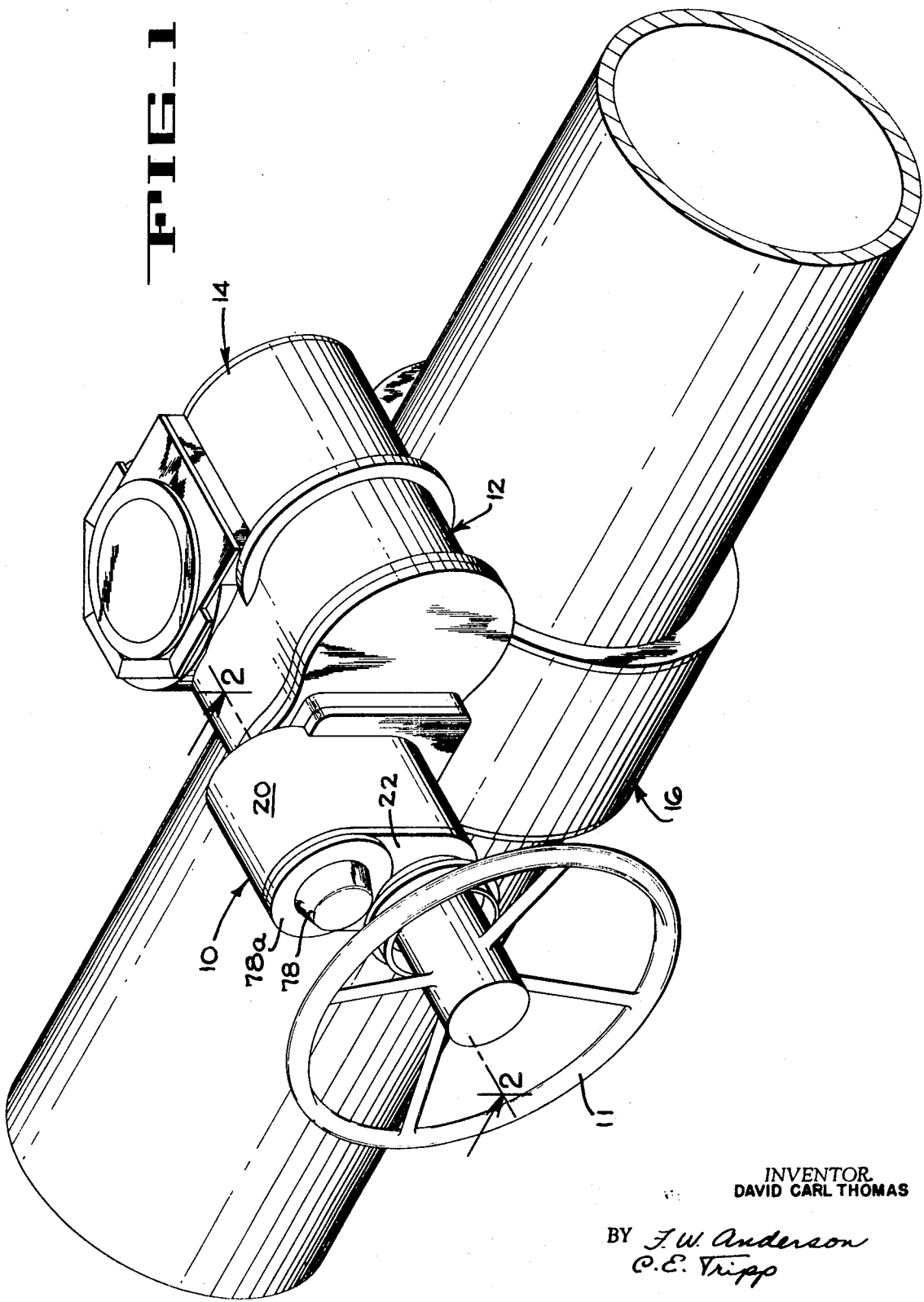
FIG_1
INVENTOR.
DAVID CARL THOMAS
BY F.W. Anderson
C.E. Tripp
ATTORNEYS

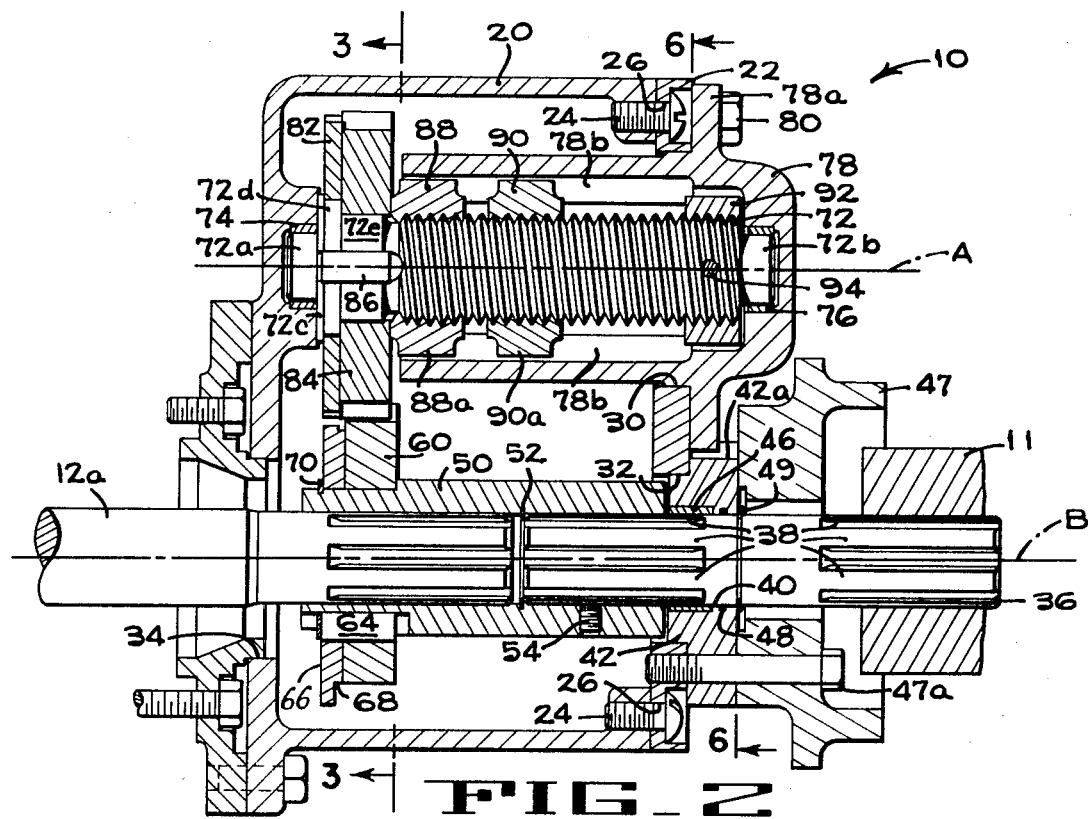
FIG_2
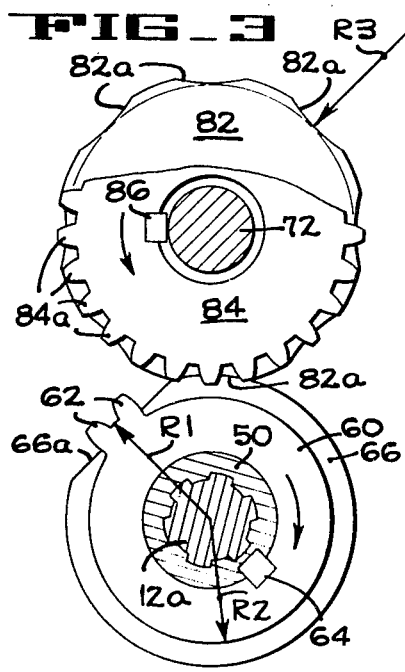
FIG_3
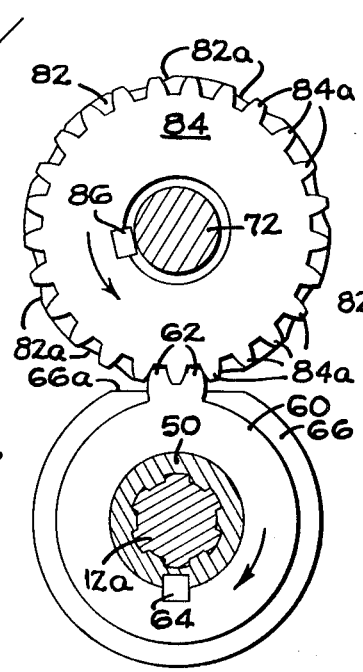
FIG_4
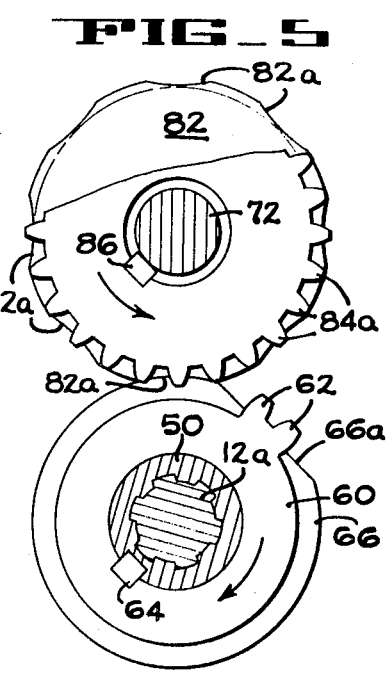
FIG_5

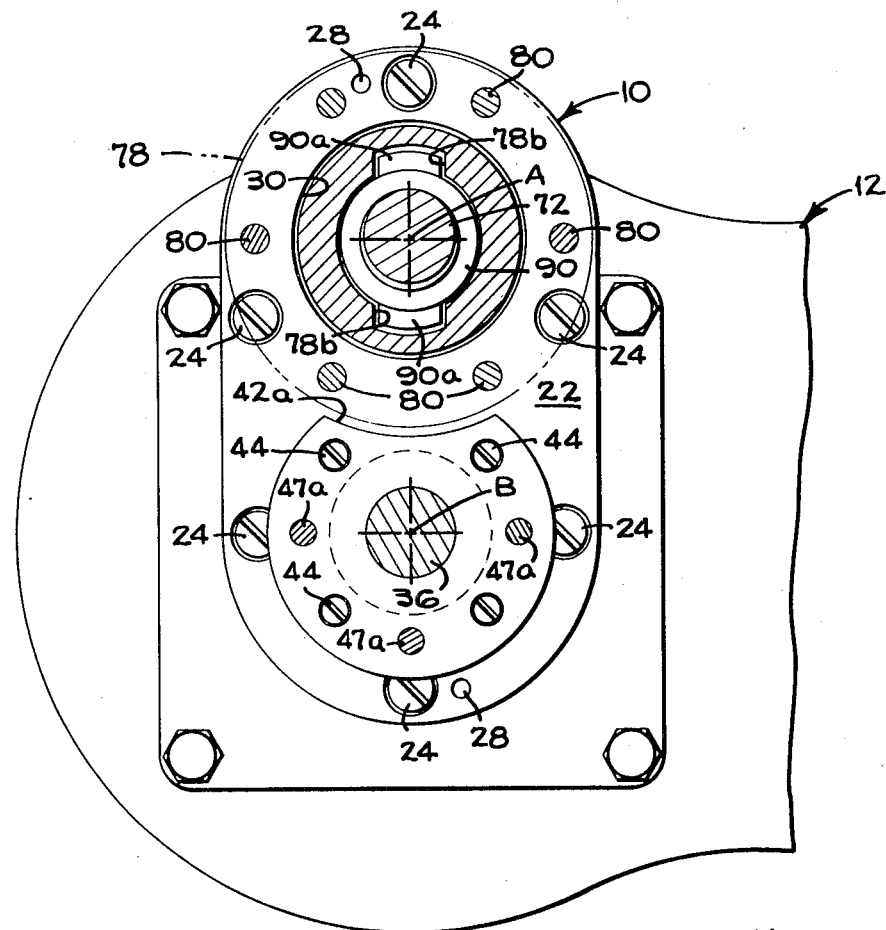
FIG_6
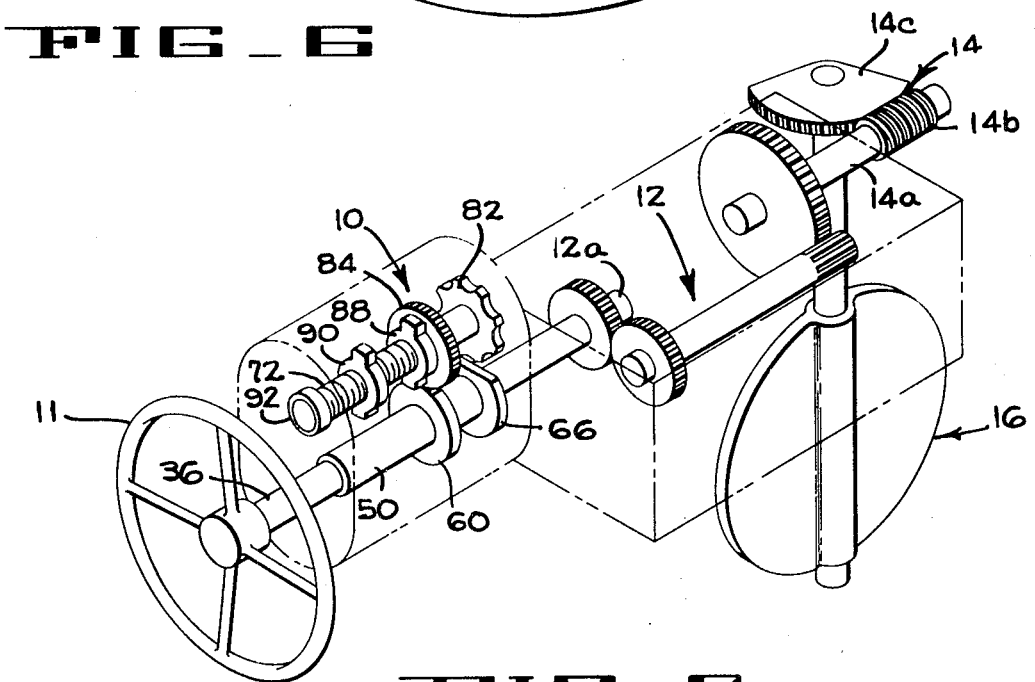
FIG_7

ADJUSTABLE STOP FOR INPUT SHAFT

BACKGROUND OF THE INVENTION

The present invention relates to limit stop mechanisms for protection of devices such as valves from stress. More particularly the present invention relates to mechanisms for positively stopping an input shaft after a predetermined number of turns to protect a rotationally actuated device, such as a valve which is connected thereto, from excessive torque which might damage the valve.

Some of the devices presently utilized to limit the number of revolutions to a valve, or other device to be protected, are installed between the valve and a gear reducer or series of gear reducers which are interconnected with an input shaft. In such an installation the limit stop device will be subjected to stresses created by the torque multiplication associated with the gear reduction. A limit stop unit which is disclosed by U.S. Pat. No. 2,902,876 utilizes a threaded input shaft in combination with a travelling gear on the input shaft and an elongated idler gear in parallel with the input shaft. As the input shaft of this invention is rotated, the travelling gear continually engages the idler gear that is turned in response to rotation of the input shaft by a fixed gear on the input shaft. As the travelling gear rotates, it moves axially relative to the input shaft between fixed abutments. Upon contacting either of the abutments which are placed at either end of the threaded portion of the input shaft, the travelling gear locks the input shaft against further rotation. Since the travelling gear of this invention moves continuously relative to the input shaft as the input shaft rotates, only a very limited number of turns of the input shaft can be made between locking positions. This would present a problem where many turns of the input shaft are required because of reduction gearing, as an overly long input shaft would be required. Another limit stop device, described in U.S. Pat. No. 1,699,116, incorporates a threaded shaft which is parallel to an input shaft. The threaded shaft is driven through a gear reduction by the input shaft. As the threaded shaft rotates in response to rotation of the input shaft, a pair of travelling nuts on the threaded shaft move axially relative to the threaded shaft between limit switches which are placed at either end of the threaded shaft. As a travelling nut engages a limit switch, a motor is stopped, halting the further rotation of the input shaft. Because of the gear reduction employed between the input and threaded shafts, torque to the threaded shaft is multiplied, and the number of turns of the input shaft between lock points is restricted as the threaded shaft continually turns in response to rotation of the input shaft. If a large number of input shaft revolutions were required, the threaded shaft of this device would have to be quite long, and the device itself large to accommodate the long shaft.

Accordingly it is an object of the present invention to positively stop an input shaft after a predetermined number of turns without the associated torque multiplication to the positive stop device that is inherent in many currently used devices. A further object of the invention is to present a compact device having a relatively short rotating element, which is easily adjustable to accurately give large and small numbers of input shaft rotations between positive stops. Another object of this invention is to provide a significant reduction between an input shaft and a limiting shaft without any increase in torque.

SUMMARY OF THE INVENTION

The present invention relates to a mechanism for limiting revolutions of a shaft for the protection of devices such as valves from excessive torque. In a preferred embodiment the input shaft stop device is coupled to a spur gear attachment which in turn is coupled to a valve actuator that is connected to the stem of a butterfly valve. The spur gear attachment and the valve actuator provide a mechanical gear reduction between an input shaft of the input shaft stop device and the stem of the butterfly valve.

The input stop mechanism includes an input shaft, which couples directly to the spur gear attachment, and a threaded shaft, oriented parallel to the input shaft, which is secured for rotation at its ends. The splined inner end of the input shaft of the stop mechanism is joined to a splined input shaft of the spur gear attachment within the stop mechanism by a splined coupling sleeve. A spur gear having only two teeth is mounted on the coupling sleeve for intermittent engagement with a continuous spur gear mounted for rotation on the threaded shaft. As the threaded shaft rotates, a pair of internally threaded travelling nuts engage the threaded shaft and move axially relative to the threaded shaft. During periods that the gear teeth are not engaged the threaded shaft is held from rotation by the coaction of two locking plates. A circular locking plate on the sleeve adjacent the intermittent gear engages a circular indent on the second locking plate on the threaded shaft to hold the threaded shaft from rotation.

During the opening or closing of a valve the input shaft to the stop mechanism is rotated manually by a workman turning a handwheel attached to the shaft. As the input shaft turns, the intermittent gear intermittently engages the spur gear on the threaded shaft and turns the threaded shaft one-eighth turn per revolution of the input shaft. The travelling nuts, which have been preadjusted to reach stop points as the valve is fully opened or fully closed, travel along the threaded shaft as that shaft rotates. If the valve is being closed, the travelling nut furthest from the gear on the threaded shaft will move in a direction away from the gear and will contact a collar on the threaded shaft as the valve is fully closed. As the nut contacts the collar the threaded shaft will be locked against further rotation and the input shaft which positively engages the threaded shaft by means of the intermittent gear is halted from further revolutions. If the valve is to be opened, the nut closest to the gear moves axially toward the gear and contacts the gear as the valve is fully opened to limit the input shaft from further turns. By virtue of the intermittent gear engagement which gives an 8 to 1 reduction between the input shaft and the threaded shaft, the threaded shaft can be shortened considerably and the input shaft stop device can be compactly constructed.

BRIEF DESCRIPTION OF THE DRAWING

FIG. 1 is a perspective drawing of the input stop mechanism operatively disposed with a spur gear attachment, valve actuator and valve.

FIG. 2 is an enlarged vertical central section taken on line 2—2 of FIG. 1.

FIG. 3 is a vertical section taken on line 3—3 of FIG. 2 prior to gear engagement.

FIG. 4 is a vertical section similar to the section of FIG. 3 but with the gears engaged.

FIG. 5 is a vertical section similar to the section of FIG. 4 but showing the gears after disengagement.

FIG. 6 is a vertical section taken on line 6—6 of FIG. 2.

FIG. 7 is diagrammatic perspective of the elements of the input stop device, spur gear attachment, valve actuator and valve.

DESCRIPTION OF THE PREFERRED EMBODIMENT

Input shaft stop mechanism 10, a device which positively stops an input shaft after a predetermined number of revolutions for the protection of a valve or other such apparatus, is connected in series, (FIGS. 1 and 7) in a preferred embodiment, with spur gear attachment 12, valve actuator 14, and butterfly valve 16. The spur gear attachment 12 contains spur gears (FIG. 7) oriented to give a gear reduction and a consequent torque multiplication. The valve actuator 14, which is joined to the output shaft of the spur gear attachment, transmits its output directly to the stem of valve 16. Actuator 14 (FIG. 7) includes a worm shaft 14a which is coupled to the spur gear attachment 12 and a worm 14b that mates directly with a worm gear segment 14c rigidly mounted on the stem of valve 16.

The input shaft stop mechanism 10 is contained within an open-ended housing 20 FIG. 2 which is a casting having an elliptical cross section. A cover plate 22 (FIGS. 2 and 6) mates with the open end of the housing 20. The cover 22 is a flat plate which is bolted to the housing by means of button head cap screws 24 recessed into counterbored holes 26 in the plate 22. Screws 24 are spaced about an elliptical bolt pattern. A pair of dowel pins 28 are fitted through the cover 22 and into the housing 20 at opposite ends of the cover. Alignment of the cover relative to the housing is maintained and shearing loads between the cover and the housing are borne by the dowel pins. Two circular holes 30 and 32 penetrate the cover plate. Hole 32 is axially aligned on axis B with hole 34 which is opposite hole 32 in the enclosed end of housing 20. Axis B is the center line of both hole 32 and hole 34.

An input shaft or rotatable element 36 having equally spaced external splines 38 about its periphery at either end and having a smooth central portion extends partially into the housing cavity through hole 40 in retainer plate 42. The retainer plate 42 is bolted to cover 22 by means of button head cap screws 44 which are equally spaced on a circular bolt circle. The retainer plate 42 has a circular periphery with an arcuate indentation 42a therein to allow for installation of an adjacent retaining cover 78. Another retainer plate 47 is slipped over the outer end of shaft 36 and bolted to retainer plate 42 by means of socket head cap screws 47a.

The center line of hole 40 in retainer plate 42 coincides with axis B such that the center line of shaft 36 which is retained within hole 40 is also in axis B. The end of hole 40 which faces into the cavity of housing 20 is increased in diameter to receive a bushing 46 which is pressed into the increased diameter of the hole 40 to provide a bearing surface for the rotation of input shaft 36. A groove is cut into the smaller diameter portion of hole 40 to receive an O-ring 48 which seals the shaft 36 against loss of lubricating grease. Snap ring 49 is fitted into a groove near the middle of shaft 36 to restrain the shaft 36 from movement into the housing.

A coupling sleeve 50 having equally spaced internal splines mates with the end of input shaft 36 which extends into the housing cavity. A retaining ring 52 which is set into a groove in the bore of sleeve 50 limits the travel of the input shaft 36 into the sleeve 50 and provides a positive stop to separate the inner end of the input shaft 36 from an input shaft 12a extending into the sleeve 50 from the spur gear attachment 12. A set screw 54 restrains the sleeve from sliding relative to input shaft 36. The outer periphery of one end of the sleeve 50 has been reduced in diameter for installation of a driver gear 60 and a locking plate 66.

Driver gear or segmental gear 60 is a flat circular disc having a pair of spur gear teeth 62 projecting from a 30° portion thereof. The remainder of the periphery of the disc of driver gear or discontinuous gear 60 has a radius R2 which is smaller than the root radius R1 of the teeth 62. The circular portion of gear 60 is cut below the root radius to provide clearance to teeth of a second gear during periods of gear disengagement. The driver gear 60 is held on the coupling sleeve 50 for rotation therewith by means of a key 64 placed in a keyway in the interior of the driver gear 60 and a complementary keyway on the outer periphery of the sleeve 50.

The locking plate or disc 66 is a circular flat disc having a flat portion 66a which aligns with the spur gear teeth 62 on gear 60. The flat portion 66a is cut from plate 66 to prevent locking plate contact during periods of gear engagement. Projecting from locking plate 66 is a circular boss 68 which abuts the driver gear 60 and spaces the locking plate 66 from driver gear 60. Locking plate 66 is also keyed to coupling sleeve 50 by the key 64. A retaining ring 70 installed in a groove in sleeve 50 holds driver gear 60 and locking plate 66 securely against axial movement relative to sleeve 50.

A threaded shaft or stop shaft 72, which is parallel to the input shaft 36, is secured for rotational movement only within the housing 20. A cylindrical bushing 74, which is pressed into a circular opening in housing 20, receives the machined end 72a of threaded shaft or element 72 and supports it in rotation. A second bushing 76 pressed into a circular opening in the bell shaped retaining element 78 supports the opposite machined end 72b of shaft 72 in rotation and restrains shaft 72 from axial movement.

Retaining element 78 (FIG. 2) is bolted to cover plate 22 by means of capscrews 80 which are equally spaced about a bolt circle (FIG. 6) on a flange portion 78a of the retaining element 78. The retaining element 78 fits into the hole 30 in cover plate 22 and is easily removable to make adjustments to the locking mechanism.

At the end 72a of the shaft 72, which is retained by housing 20, are presented three bosses 72c, 72d, and 72e, having progressively smaller diameters, going from the wall of the housing 20 toward the retaining element 78. The first of these bosses 72c, abuts the raised area of the housing 20 that supports bushing 74 and functions as a spacer.

The second boss 72d receives a locking plate 82. Locking plate or disc 82 is a circular flat disc having eight arcuate indentations 82a spaced at 45° intervals about its periphery. The radius R3 of these indentations is slightly greater than the radius of locking plate 66 which engages the indentations during gear disengagement.

Driven gear or continuous gear 84 is pressed onto the third boss 72e of shaft 72. The driven gear 84 is a spur gear having 24 teeth 84a which mesh with the two teeth 62 of the driver gear 60 and have the same root circles, spacing, and addendum circle dimensions and shape as the two teeth 62 on the driver gear. Since the teeth on the driver gear and the driven gear have the same pitch diameter, the tooth load or torque on each of the two shafts 36 and 72 will be related in a one to one relationship when the gears are in engagement.

Driven gear 84 and locking plate 82 are keyed to shaft 72 by a key 86 placed into aligned keyways in locking plate 82, driven gear 84, and shaft 72.

A pair of travelling stop nuts or threaded members 88 and 90 having internal threads which mate with the external threads of shaft 72 are disposed for axial travel on shaft 72. Nuts 88 and 90 are restrained from rotation with shaft 72 by means of guides 78b (FIG. 6) formed in restraining element 78 which contain wing portions 88a and 90a of the nuts 88 and 90 as the nuts travel axially relative to shaft 72. A collar 92 is secured to shaft 72 by means of a roll pin 94. The collar 92 which is rotatable with shaft 72 provides an abutment for positively stopping travelling nut 90 at the end of its travel.

In the preferred embodiment, as stated previously, the input shaft stop mechanism 10 is connected in series with the spur gear attachment 12, and the valve actuator 14 which is joined directly to the stem of valve 16. A handwheel 11 is attached to input shaft 36 outside of the housing of the input shaft stop mechanism for manual opening and closing of valve 16. To open valve 16 a workman must turn the handwheel 11 counterclockwise and to close the valve 16 the handwheel 11 must be turned clockwise (FIGS. 1 and 7).

To illustrate the operation of the input stop mechanism 10 it is first assumed that the valve 16 is fully opened. An operator attempting to close valve 16 will turn handwheel 11 and shaft 36 which is connected thereto, in a clockwise direction. The number of turns imparted to shaft 36 will be reduced by spur gear attachment 12 (FIGS. 1 and 7) and again by valve actuator 14 (FIGS. 1 and 7) with an associated torque multiplication. Thus, the stem of valve 16 will be turned only a fraction of a turn with each full turn of shaft 36, but the torque on the stem of valve 16 will be much greater than the torque on input shaft 36. So the stop nut shaft 72 has been placed adjacent shaft 36 to avoid this torque multiplication.

As shaft 36 turns clockwise during the closing of valve 16, stop nut shaft 72 is rotated intermittently counterclockwise as a result of the engagement of driven gear 84 by the two teeth 62 of driver gear 60. The interaction of driven gear 84 and driver gear 60 in combination with locking plates 66 and 82 can be described as a Geneva type motion with intermittent gear movement. During the engagement of driver gear 60 and driven gear 84 stop nut shaft 72 is rotated 45° or one-eighth turn for each full turn of shaft 36. To insure that the driven gear 84 remains stopped and in a correct position to mesh with the driver gear 60 each time the two tooth section comes into contact with the continuous gear, locking plate 82 is attached to driven gear 84. As the two teeth of driver gear 60 leave engagement with the teeth of driver gear 84, the circular surface of locking plate 66, intersecting the flat 66a, engages one of the arcuate indents 82a on locking plate 82 and prevents rotation of gear 84 when it is in a period of rest. Stop nut shaft 72 is held against rotation while locking plate 66 engages the indentation of locking plate 82.

As has been stated, shaft 72 is rotated one-eighth revolution or 45° each time input shaft 36 makes one turn. Ordinarily if two continuous gears having 24 teeth and the same pitch diameters mesh, the driver gear in such an arrangement would turn the driven gear 15° for each tooth engaged. Because there are only two teeth on the driver gear in the present invention, the first tooth to engage a tooth of the driven gear will rotate the driven gear 15° before the second tooth is engaged, but the second tooth will turn the driven gear 30°, rather than 15°, because of the increased duration of contact between that second tooth and the tooth contacted on the driven gear. Duration of contact between the second tooth and the tooth of the driven gear is increased because there is no third gear tooth on the driver gear to engage a third tooth on the driven gear before the second tooth has terminated driving engagement as is the case with two gears having a full complement of teeth.

As input shaft 36 is rotated clockwise during the valve closing operation and stop nut shaft 72 is correspondingly given a counterclockwise rotation, stop nuts 88 and 90 move axially relative to shaft 72 toward collar 92. Stop nut 90 has been preset to come to a full stop against collar 92 as valve 16 reaches the fully closed position. As stop nut 90 tightens on shaft 72 against collar 92, shaft 72 is stopped from further counterclockwise rotation and, as a consequence, shaft 36 which positively engages shaft 72 by means of the driver and driven gears is halted from further clockwise rotation.

The stop nuts 88 and 90 are preset to stop the input shaft 36 after a predetermined number of turns which are required to open or close valve 16. Adjustment of the stop nuts is made with the input shaft stop unit 10 installed. To adjust the nuts a workman can either pull all of the bolts holding retainer 78 to cover 22 and merely rotate retainer 78 or pull retainer element 78 away from cover 22 and rotate the stop nuts 88 or 90 while holding shaft 72 stationary. Adjustments are made with the valve in either the fully closed or fully open positions. With the valve 16 fully closed, nut 90 contacts collar 92. With valve 16 fully open nut 88 abuts gear 84.

The operation of the input shaft stop mechanism during opening of valve 16 is similar to the operation during the valve closing operation except that input shaft 36 is now being rotated counterclockwise and stop nut shaft 72 is being rotated one-eighth of a clockwise turn or 45° with each revolution of shaft 36. During periods of disengagement of the teeth of driver gear 60 and driven gear 84 stop nut shaft 72 is held from rotation by the engagement of one of the arcuate indentations of locking plate 82 by the circular portion of locking plate 66. Stop nuts 88 and 90 move axially relative to shaft 72 toward gear 84. As valve 16 is fully opened, nut 88 tightens on shaft 72 against gear 84 to stop the rotation of stop nut shaft 72 and consequently that of input shaft 36.

As an illustration of the number of input shaft revolutions which can be made between positive stops with this device, consider an input stop device of the type described with a threaded shaft having a 1⅜ inches - 16 Acme thread. And assume that the nuts are free to move 2 inches between stops. The total reduction of this arrangement will be 2 inches × 16 threads/inch × 8:1 gear reduction = 256 to 1. Since the input shaft can be turned through 256 revolutions between positive stops of the travelling nuts, the threaded shaft can be relatively short and the input stop mechanism can be compactly made.

Although the best mode contemplated for carrying out the present invention has been herein shown and described, it will be apparent that modification and variation may be made without departing from what is regarded to be the subject matter of the invention.

What I claim is:

1. A device to limit revolutions to a mechanism comprising in combination, a rotatable input shaft for transmitting rotation to the mechanism, a discontinuous gear on the input shaft, a threaded stop shaft adjacent the input shaft, a continuous gear on said threaded stop shaft for intermittent engagement by said discontinuous gear, said discontinuous gear intermittently engaging said continuous gear to rotate said threaded input shaft, threaded members mounted for relative axial movement on said threaded stop shaft, said threaded members being adjustable to limit rotation of the threaded stop shaft, after the input shaft has made a predetermined number of revolutions, and positively stop the threaded stop shaft and the rotatable input shaft from further rotation.

2. A device for limiting revolutions to a mechanism comprising in combination, an input shaft for imparting revolutions to the mechanism, a discontinuous gear on said shaft, a threaded stop shaft parallel to said input shaft, a continuous gear on said stop shaft, said continuous gear being intermittently engaged by said discontinuous gear for rotation of the stop shaft a fraction of a turn for each turn of the input shaft, an abutment member on the stop shaft, a traveling nut mounted on said stop shaft for movement axially of said stop shaft as said stop shaft turns, said nut being adjustable to limit rotation of the stop shaft by engagement of said nut against the abutment member, after the input shaft has made a predetermined number of turns, to stop the stop shaft and the input shaft from further rotation.

3. The device of claim 1 wherein a first locking plate is mounted for rotation with the rotatable stop shaft and a second locking plate having spaced arcuate indents is mounted for rotation with the threaded stop shaft, said first locking plate engaging one of the arcuate indents of the second locking plate during gear disengagement to hold the continuous gear in position to engage the discontinuous gear.

4. The device of claim 1 wherein said threaded stop shaft is turned 45° with each revolution of the rotatable input shaft.

5. The device of claim 1 wherein the discontinuous gear and the continuous gear have the same pitch diameter to give a one to one torque relationship between the rotatable input shaft and the threaded stop shaft.

6. In an apparatus for opening and closing a valve including a valve actuator operatively connected to the stem of the valve and a spur gear attachment coupled to the actuator, the improvement comprising a device for positively limiting revolutions to the valve, said device including an input shaft for imparting rotation to the stem of the valve, a discontinuous gear mounted on the input shaft, a threaded stop shaft adjacent the input shaft, a continuous gear mounted on the threaded stop shaft for engagement with the discontinuous gear, said continuous gear being intermittently engaged by the discontinuous gear for rotation of the threaded stop shaft a fraction of a turn with each full revolution of the input shaft, a first locking disc having a circular periphery portion on the input shaft, a second locking disc having equally spaced arcuate indentations about its periphery on the threaded stop shaft, the arcuate indentations of the second locking disc being engaged by the circular periphery portion of the first locking disc to hold the continuous gear in position during gear disengagement, a pair of traveling nuts engaged for axial movement on the threaded stop shaft, a fixed abutment on the threaded stop shaft, said nuts being adjustable to limit rotation of the shaft after a predetermined number of revolutions by tightening on the threaded stop shaft against an abutment to lock the threaded stop shaft and the input shaft against further rotation.

7. A device for limiting the number of revolutions imparted to a mechanism comprising, in combination, an input shaft for imparting revolutions to the mechanism, a discontinuous gear on the input shaft, a threaded stop shaft adjacent the input shaft, a continuous gear on the threaded stop shaft, the continuous gear being intermittently engaged by the discontinuous gear for rotation of the threaded stop shaft a fraction of a turn with each revolution of the input shaft, a first locking disc having a circular periphery portion on the input shaft, a second locking disc having spaced arcuate indents on the threaded stop shaft, said arcuate indents of the second locking disc being engaged during gear disengagement by the circular periphery portion of the first locking disc to hold the continuous gear in position for engagement with the non-continuous gear, a fixed abutment near the end of the threaded shaft, a pair of traveling nuts engaged for axial movement on the threaded shaft, said traveling nuts being adjustable to halt rotation of the input shaft after a predetermined number of revolutions by tightening on the threaded stop shaft against an abutment to lock the threaded stop shaft and input shaft from further rotation.

8. A device for limiting revolutions to a mechanism comprising in combination, an input shaft, an output shaft for imparting revolutions to the mechanism, said input and output shafts having a coincident axis of rotation, means drivingly connecting said input and output shafts, a threaded stop shaft parallel to said input shaft, a discontinuous gear operatively connected with said input and output shafts, a continuous gear operatively connected with the stop shaft, means cooperating between said input and output shafts and said stop shaft for locking said stop shaft during gear disengagement, and means for limiting rotation of said stop shaft during gear engagement.

* * * * *